US006963972B1

(12) United States Patent
Chang et al.

(10) Patent No.: US 6,963,972 B1
(45) Date of Patent: Nov. 8, 2005

(54) METHOD AND APPARATUS FOR NETWORKED INFORMATION DISSEMINATION THROUGH SECURE TRANSCODING

(75) Inventors: Yuan-Chi Chang, White Plains, NY (US); Chung-Sheng Li, Ossining, NY (US); Richard Yeh-whei Han, New York, NY (US); John R. Smith, New Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 912 days.

(21) Appl. No.: 09/670,295

(22) Filed: Sep. 26, 2000

(51) Int. Cl.[7] .......................... H04L 9/00; G06F 11/30; H04N 7/167
(52) U.S. Cl. ...................... 713/153; 713/167; 713/193; 713/201; 380/201; 380/217; 705/57
(58) Field of Search ............................... 713/153, 151, 713/152, 200, 201

(56) References Cited

U.S. PATENT DOCUMENTS 5,504,816 A * 4/1996 Hamilton et al. .......... 380/217
6,072,942 A * 6/2000 Stockwell et al. .......... 709/206
6,345,303 B1 * 2/2002 Knauerhase et al. ....... 709/238
6,553,393 B1 * 4/2003 Eilbott et al. ............... 715/513
6,763,460 B1 * 7/2004 Hild et al. ................... 713/161

* cited by examiner

Primary Examiner—Kambiz Zand
(74) Attorney, Agent, or Firm—Anne V. Dougherty

(57) ABSTRACT

A method and system enables network intermediaries such as proxies to transcode multimedia data without violating end-to-end security guarantees. In one embodiment, a content provider decomposes a data stream into a plurality of components, each of which are independently encrypted. In a preferred embodiment, an intermediary or proxy performs transcoding of the components by prioritizing and dropping predetermined components, in accordance with unencrypted clear-text metadata associated with each component, without the need for decrypting the components. Clear-text metadata preferably provides a semantic understanding of the absolute or relative importance/priority of the components with respect to each other, thereby facilitating the transcoding process. The destination/client device can subsequently decrypt the components transmitted by the transcoding proxy and reassemble them into a representation of the original data content.

28 Claims, 8 Drawing Sheets

METHOD AND APPARATUS FOR NETWORKED INFORMATION DISSEMINATION THROUGH SECURE TRANSCODING

FIELD OF THE INVENTION

The method and apparatus of present invention relate generally to transcoding systems, and more particularly relates to a system wherein transcoding proxies securely transcode encrypted multimedia content in a manner that avoids decrypting the content.

DESCRIPTION OF THE PRIOR ART

Transcoding, as it is understood in the art, refers to the technique of transforming multimedia content (e.g., text, images, audio, video and the like) from a first original format, in which the multimedia content was encoded, into a second format. A transcoder is a technological realization of the transcoding function for a specific task. The transcoding technique is essential in adapting content for presentation on client devices that provide little or no support for displaying or playing back the content in its original format. For example, Web pages that were not originally designed to be displayed on cell phones and wireless personal digital assistants (PDA) can be transcoded for display/playback on such devices. In addition, transcoding of Web content may be used to increase compression of multimedia content over slow Internet access links to improve the speed of access to that content.

Transcoding is often performed by an intermediary or proxy interposed between the content provider's Web server and the client device's Web browser. The conventional approach to transcoding in a proxy requires that the data be non-encrypted in order to be able to transcode the data. If the multimedia data was initially encrypted, then the transcoding proxy must first decrypt the data before transcoding the data. Decrypting multimedia data, however, violates the end-to-end security guarantee because a third party (e.g., a proxy) other than the content provider and client can eavesdrop on the decrypted data stream.

There are two primary objectives for applying transcoding to multimedia content. The first objective is to reduce the download delay of Web pages over low-bandwidth access links, such as modem links and wireless access links. The transcoding function typically resides within the intermediary or proxy. The transcoding proxy is typically a transcoder that employs any lossless or lossy compression technique to reduce the size, in bytes, of the multimedia content (e.g. images are further compressed, text is summarized, etc.). By reducing the number of bytes transferred over the access link, the transcoding proxy is able to more quickly deliver the content to the receiver, thereby significantly reducing the perceived response time. Transcoding has also been applied to video to reduce the bit rate of the video content so that clients connected over low-bandwidth links can receive the reduced video stream. The terms distillation, summarization, dynamic rate shaping and filtering are frequently used as synonyms for transcoding when reducing latency (e.g., via compression over low-bandwidth links) is the primary motivation for transcoding.

A second objective for applying transcoding to multimedia content is to resolve the mismatches between the decoding format supported by a client device and the encoding format employed by a provider of multimedia content. To enable playback or display of multimedia content on a client device that is mismatched to that content, a transcoder generally transforms the multimedia content from the originally encoded format to the decoding format understood by the client device. Coder/decoder (codec) mismatches may arise due to hardware, software, environmental and human behavioral constraints on client devices and/or content providers. Two traditional examples of transcoding technologies are speech recognition (i.e. speech-to-text transcoding) and speech synthesis (i.e. text-to-speech transcoding), in which multimedia content is transformed to resolve codec mismatches between the content provider and the client device utilizing the content.

Transcoding is also currently used to transform Web pages (e.g., images and HTML text) to enable handheld PDA's to browse the Web. PDA client devices are often constrained by their relatively small screen size, limited display depth, limited memory, slow processor and limited support of media types. For such devices, a transcoding proxy is applied, for example, to transform color GIF and JPEG images into 2-bit grayscale bitmaps to accommodate a PDA's software constraints and also into downscaled thumbnails to accommodate a PDA's hardware constraint of a small screen size. The terms translation, content repurposing, content adaptation, reformatting, data transformation, media conversion, clipping, universal access, format conversion and filtering are often used synonymously for transcoding when it is applied to adapt to client heterogeneity.

Placement of the transcoding function in an intermediate proxy introduces a security problem. The conventional approach to transcoding in a proxy requires that the data be non-encrypted in order to be transcoded. If the multimedia data was initially encrypted, then the transcoding proxy must first decrypt the data before it is transcoded. In order to be able to decrypt the data, the proxy must possess the key that is used to encrypt the data. This type of proxy is commonly referred to as a trusted proxy. This scenario, however, has practical difficulties as either the source or destination must transmit the key to the proxy, which may not have any affiliation with either the source or destination device(s). This scheme breaches the end-to-end security guarantee since a third party (proxy), other than the content provider and client, can potentially eavesdrop on the decrypted data.

Prior attempts at providing a secure transcoding system have failed to address and/or solve the unique problem associated with the secure transcoding of data by a proxy. Prior art approaches involving the subdividing of multimedia content into multiple components include Progressive Image Transmission (PIT) and layered video multicast. In PIT, each image is divided into multiple components, typically arranged from perceptually most important to least important. The content provider transmits the perceptually most important components first to the client device, followed by the less important components. Although it has been shown that PIT reduces the perceived delay of image delivery (since the most important components arrive and are displayed first), transcoding is not practiced between the content provider and the client device.

In layered video multicast, a video stream is subdivided into multiple components. Receivers subscribing to the video session will subscribe to a subset of the components. If a receiver's access link has low bandwidth, then the receiving client device will only subscribe to the most basic components of the video stream. Routers supporting the multicast routing protocol take into account the receiver's subscription requests and selectively filter or drop the undesired multicast components. However, the layered video multicast (or layered coding in general) approach does not address how to protect the information being transmitted while allowing secure selective filtering/transcoding. Nor does this approach provide a means to detect tampering.

The SERVANT project of IBM Zurich Research has proposed a mechanism for allowing a client and server to establish a secure session while still enabling an untrusted transcoder access to content fields that may need to be transcoded. The transcoder need not be trusted since the server can selectively encrypt security sensitive content fields, and may include a signed summary document of the content which states how each field of the content may be transcoded. Thus security-sensitive content is protected from the transcoder, and the client is able to verify that the transcoding performed on behalf of the client is in accordance with the intentions of the server. SERVANT separates the content into two bins: secure and non-secure. The transcoding proxy, however, still cannot transcode the "secure" part of the content and thus does not address the problem stated herein.

With respect to conventional tamper detection schemes, prior art in tamper detection mechanisms include the use of either visible or invisible watermarks. Both visible and invisible watermarks embed some form of patterns, bar codes, digital signatures, etc. into the data. The tampering of the data can be detected through the inconsistency or the absence of the watermarks. The issue addressed by the prior art, however, differs from that addressed by the present invention, as prior art involves the case where all of the data is in clear text (unencrypted) form.

Existing methods and apparatus do not address or provide a solution to the problem of enabling a transcoding proxy to transcode data from a content provider or similar source for use by a client device while maintaining end-to-end security throughout the transcoding system. There remains a need, therefore, in the field of transcoding to provide secure transcoding of multimedia content by an intermediary or proxy.

OBJECTS AND SUMMARY OF THE INVENTION

It is an object of the present invention to provide a method and apparatus for securely transcoding multimedia content by an intermediary or proxy.

It is another object of the present invention to provide a method and apparatus for transcoding data by a proxy without the proxy decrypting the data or otherwise destroying the guarantee of end-to-end system security.

The present invention provides a solution to the security problem introduced by a transcoding proxy which, in accordance with one embodiment, preferably includes having a content provider first subdivide or componentize data (e.g., multimedia content) into multiple components. Each of these components may then be independently encrypted. A transcoding proxy downstream of the content provider preferably selectively filters or drops some of the encrypted components. Selective filtering achieves compression-based transcoding of the content, thereby improving the speed of content delivery over slow access links without having to decrypt any of the components of the content.

In one embodiment, the present invention includes three distributed entities or functional units that encode, securely transcode and decode multimedia content respectively. The first entity (e.g., a content provider) preferably takes an existing multimedia object and subdivides the source data into multiple data components. Each of these components is also preferably annotated with a metadata header, including but not limited to component identification fields and information regarding the relative importance/priority of the particular component. For each component, the content provider preferably encodes or assembles a message comprising a clear-text (unencrypted) metadata header, an encrypted version of the metadata header, and the encrypted component. For each component, the content provider then transmits the corresponding assembled message to the second entity, a transcoding proxy or intermediary.

The transcoding proxy receives the multiple messages corresponding to each component and inspects the metadata header of each message to determine which encrypted components should be selectively filtered. The remaining messages comprise a securely transcoded version of the original multimedia object and are then transmitted to the third entity, a client device.

The client device receives the remaining messages. For each transmitted message, the client device decrypts the message and compares a decrypted version of the metadata header with a clear-text metadata header, both of which are extracted from the message. If the two headers do not match to within a predetermined acceptable degree, tampering has most likely occurred. If the two headers match, then the client device concludes that there has been no tampering and proceeds by decoding the decrypted component of the message.

These and other objects, features and advantages of the present invention will become apparent from the following detailed description of illustrative embodiments thereof, which is to be read in connection with the accompanying drawings, wherein like elements are given identical reference numerals throughout the various figures.

DESCRIPTION OF THE PREFERRED EMBODIMENTS

Figure 1:
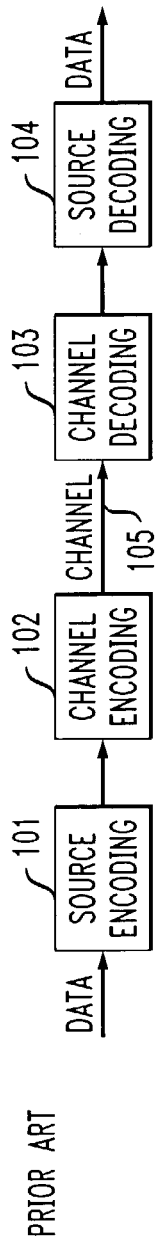
FIG. 1 is a block diagram illustrating a conventional communication system for channel encoding and decoding of data.

FIG. 1 depicts a communication system for encoding and decoding of data transmitted over a channel. As appreciated by those skilled in the art, the channel itself may be implemented in any known fashion, for example, as one or more dedicated data lines or wireless communication links, including cellular, satellite, microwave, or electromotive force (EMF) networks. In a typical communication process, the data sent by a data source or content provider will usually go through both source and channel encoding and decoding before the data reaches its destination (e.g., a user).

With reference to FIG. 1, source encoding 101 and decoding 104, in the general sense, refers to methods and apparatus for reducing or compressing the total amount of source data by exploiting any redundancy in the data. Various compression techniques are known in the art and may include, for example, lossless (e.g., run-length coding, Huffman coding, arithmetic coding, and LZ method used in the gzip command on UNIX), lossy (e.g., Discrete Cosine Transformation (DCT) and wavelets), or any combination of both (e.g., JPEG).

After the data has been compressed, the data may require channel encoding 102, such as, for example, 8B/10B coding for Fiber Channel and Gigabit Ethernet, in order to remove the DC component of the data for enabling the data to be sent through AC-coupled transmitters/receivers. Channel coding also ensures sufficient data transitions to allow fast data synchronization. Corresponding channel decoding 103 is needed in order to remove the added data and/or transitions.

Figure 2:
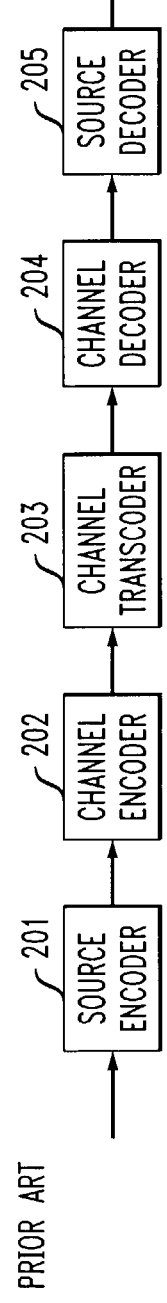
FIG. 2 is a block diagram depicting an example of a conventional system employing source encoding and decoding in conjunction with channel encoding and decoding.

When the channel encoding method utilized by the transmitter is different from the channel decoding technique employed by the receiver, it is possible to apply channel transcoding on the data passing through the channel, as shown in FIG. 2. Using this scheme, the channel transcoder 203 is typically inserted between the channel encoder 202 and the channel decoder 203. The source encoder 201 and decoder 205 are essentially not affected.

Figure 3:
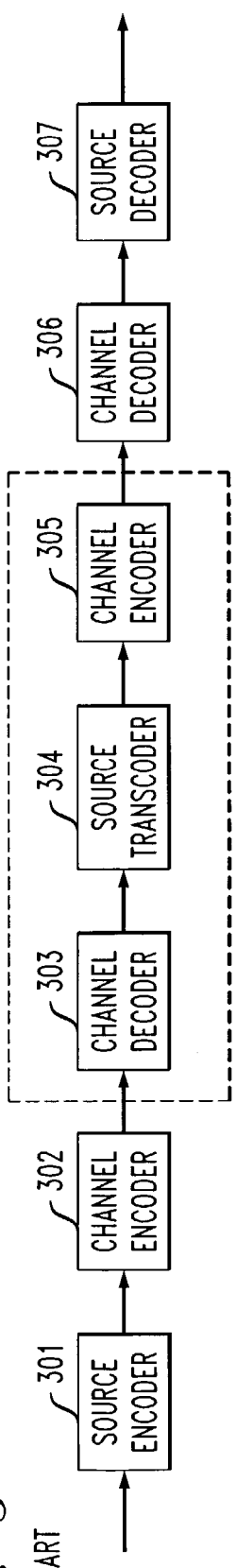
FIG. 3 is a block diagram illustrating a conventional system employing source and channel encoding/decoding, in addition to source transcoding.

FIG. 3 illustrates a conventional scenario where the source transcoding method differs from that used by the receiver. With reference to FIG. 3, when the method used at the source encoder 301 is different from that used at the source decoder 307, a source transcoder 304 is required. In addition, a channel decoder 303 must be added in front of the source transcoder 304 in order to decode the data channel encoded by the channel encoder 302. The data transcoded by the source transcoder 304 subsequently needs to be channel encoded by channel encoder 305 and decoded again at the receiver by the receiver channel decoder 306.

Figure 4:
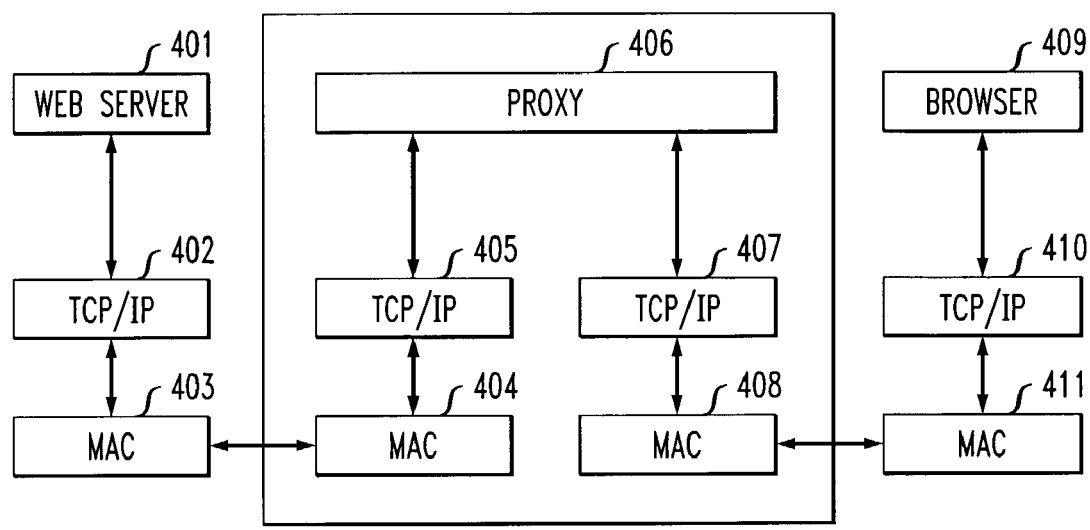
FIG. 4 is a block diagram depicting a conventional system for transcoding data in a networked environment which includes a proxy between the server and the client.

In a networked environment (e.g., the Internet) based, for example, on a TCP/IP communications protocol, it is known to introduce a proxy server or sock server between the client and the server. In this manner, the proxy will act on the client's behalf to perform various networking operations. FIG. 4 illustrates a conventional architecture including such a proxy server. Referring now to FIG. 4, both a browser 409 (e.g., Netscape and Internet Explorer) and a Web server 401 (e.g., the Apache server or Lotus Domino server) may be running based on stateless communications protocol, such as HyperText Transport Protocol (HTTP) for example. The HTTP protocol will invoke stateful TCP protocol, which in turn invokes stateless IP (402, 405, 407, 410). In the example of FIG. 4, the IP packet will then be fragmented and encapsulated by an additional header required for the Media Access Protocol (MAC) 403, 404, 408, 411 (e.g., Ethernet, Fiber Channel, Asynchronous Transfer Mode). In general, the browser 409 connects to the proxy 406 initially. Subsequently, the proxy 406 will be responsible for establishing connection with the web server 401 and essentially serves to relay the data transmitted between the browser 409 and the Web server 401. As appreciated by those skilled in the art, proxies are widely used for firewalls, for example, so that each incoming connection from the browser can be verified, and the target address controlled.

Figure 5:
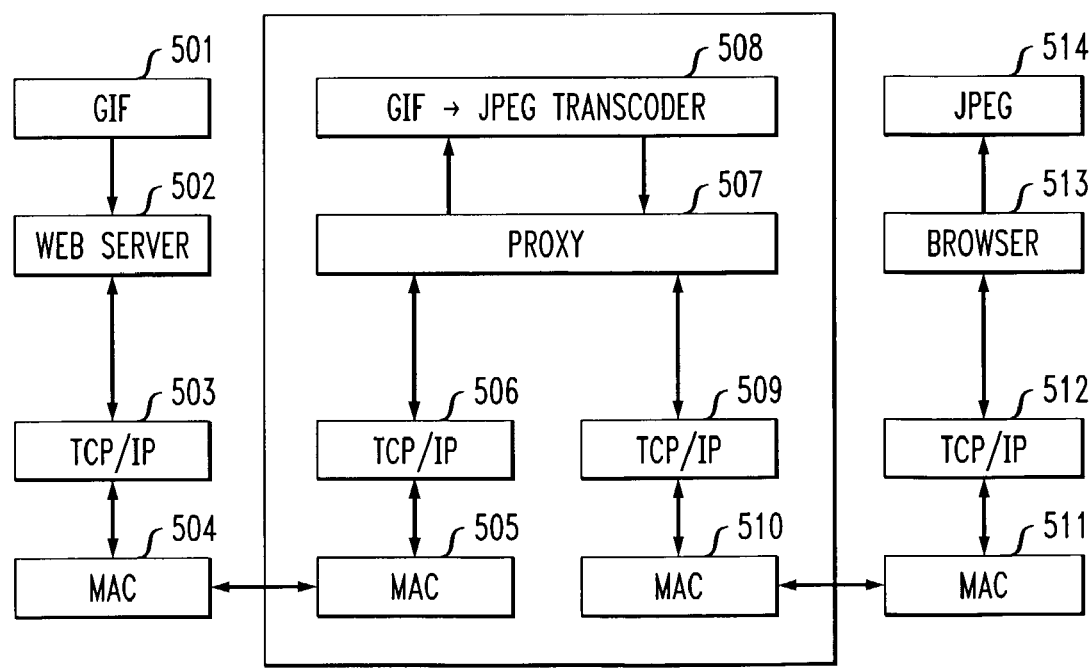
FIG. 5 is a block diagram illustrating an example in which an image in GIF format from a web server is converted into JPEG format through a transcoding proxy and is displayed at the browser.

FIG. 5 illustrates an example of a scenario when a GIF image 501, which may be stored at a Web server 502, is retrieved by a browser 513. In this example, proxy 507 may perform a conversion or transcoding of the GIF image format 501 to a JPEG format 514 using a transcoding module 508 adapted to perform such transcoding. In at least aspect, this may be desirable in order to reduce the data volume of the source image. As illustrated in the example of FIG. 5, it should be appreciated that the browser 513, proxy 507, and Web server 502 all communicate with each other through TCP/IP (503, 506, 509, 512) and MAC (504, 505, 510, 511) protocol.

Figure 6:
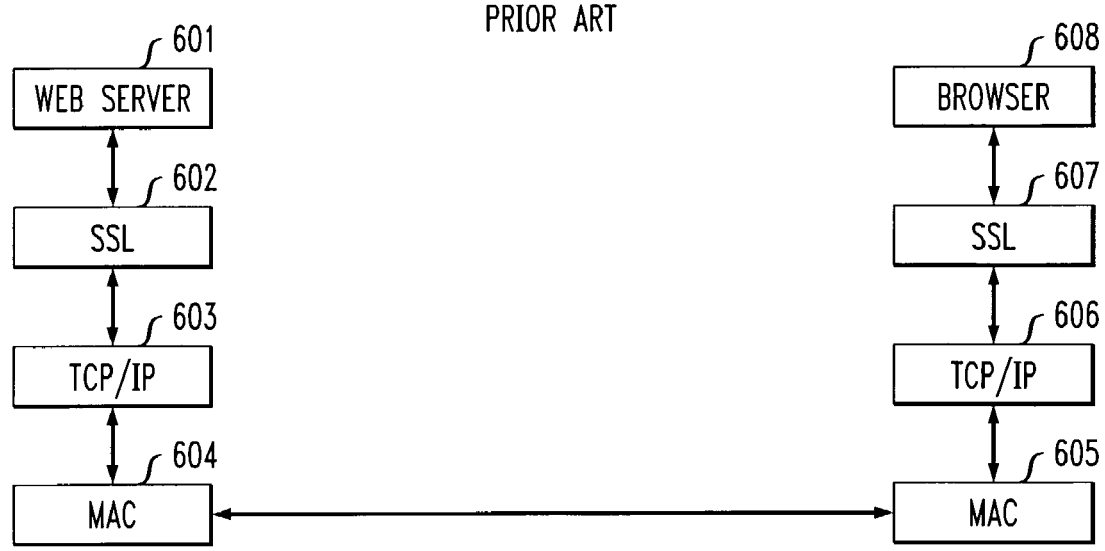
FIG. 6 is a block diagram illustrating an example of a communication system in a networked environment employing a secure socket layer (SSL) for securely transmitting data between a web server and a browser.

For secure transmission of data, the browser and the Web server may communicate through a Secure Socket Layer (SSL), in which known encryption schemes such as DES and public key can be invoked to encrypt the data in order preserve security. An example of a conventional secure communication topology is illustrated in FIG. 6. With reference to *Figure* 6, a secure layer (e.g., SSL) 607, 602 typically resides between the browser 608 and TCP/IP 606 on the client side, and between the Web server 601 and TCP/IP 603 on the server side. Security is imposed on a per session basis. As is known by those skilled in the art, the SSL 607 on the browser side first requests establishing a connection with the SSL 602 on the web server side. The server side SSL 602 grants the connection and sends a public key to the browser 608. The browser side SSL 607 then uses the public key received from the server 601 to encrypt a session key, which is sent to the server. The sever side SSL 602 then uses its own private key to decrypt the session key. From then on, both the browser 608 and server 601 will communicate through the same session key. All data sent by the browser and the server will be encrypted by the same session key.

Figure 7:
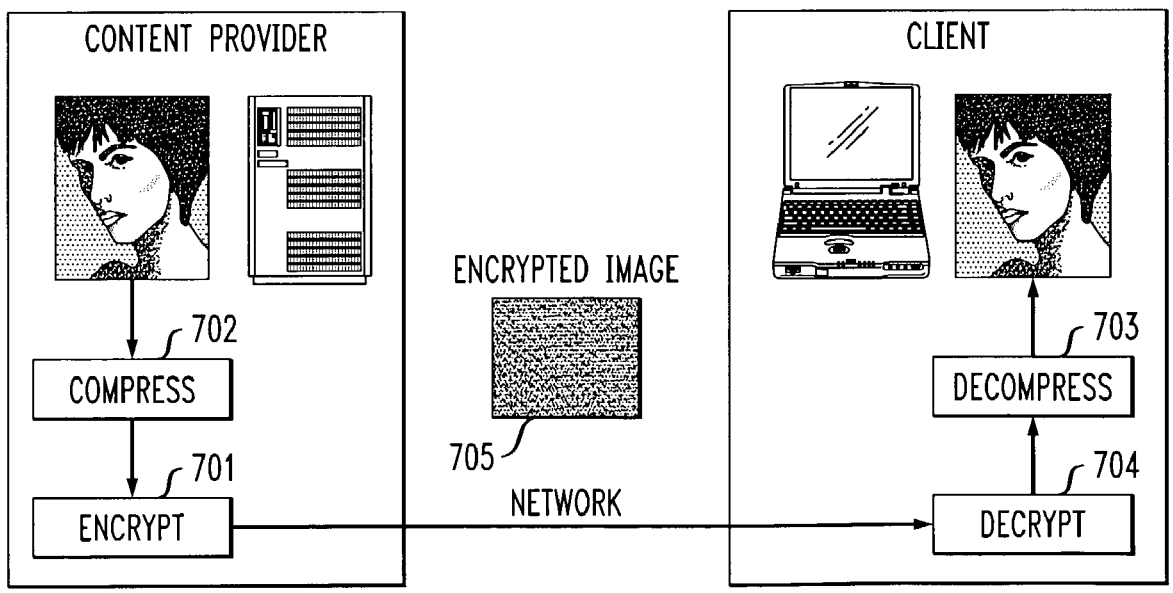
FIG. 7 is a conceptual block diagram illustrating a conventional system for transmitting data between a content provider and a client while ensuring end-to-end security of encrypted data.

It is to be appreciated that the SSL layer is transparent to the TCP/IP 603, 606 and MAC layers 604, 605 on both server and browser side, respectively. Furthermore, when a proxy-like service (e.g., a firewall) is introduced between a browser and a server, the proxy will still be able to validate the requester (browser) and destination (server) based on the IP address, assuming a TCP/IP protocol is used. However, the proxy will not be able to look into the data as they are all encrypted. An example of a typical encryption method is illustrated in FIG. 7. As shown in FIG. 7, a content provider may perform a data compression 702 (e.g., through any known source coding techniques, for example JPEG) and encrypts 701 the data; in this example, an image. The encrypted data 705 may then be sent across a network communication channel to the client device requesting the data. Assuming the client device is trusted (i.e., secure), then the client device possesses the algorithm for decrypting 704 and decompressing 703 the data, essentially reconstructing the original image. If the encrypted data is observed at any point along the network between the content provider and the client device, an observer will not be able to eavesdrop since the encrypted data cannot be deciphered without possessing the decryption algorithm. Consequently, the observer will see only scrambled data 705.

It is to be appreciated that, as depicted in the example system of FIG. 7, encryption typically follows compression at the sender (i.e., content provider). Conventional compression (source coding) algorithms are generally adapted to remove statistical redundancy in the data while also reducing the size of the resulting output data. In contrast, encryption algorithms generally scramble the data in such a way as to make the data appear random (i.e., statistical redundancy is removed), but the size of the data is not reduced and may even be increased, as compared to the original input data. If data encryption were to precede the compression step, the encryption step would scramble the data so that there would be little statistical redundancy, if any, to remove during the compression stage. As a result, little or no data compression would be achieved. Moreover, the randomness introduced by encryption may be so great that the compression algorithm actually expands rather than reduces the size of the data. For this reason, the order of execution at the sender is preferably compression first, followed by encryption.

Figure 8:
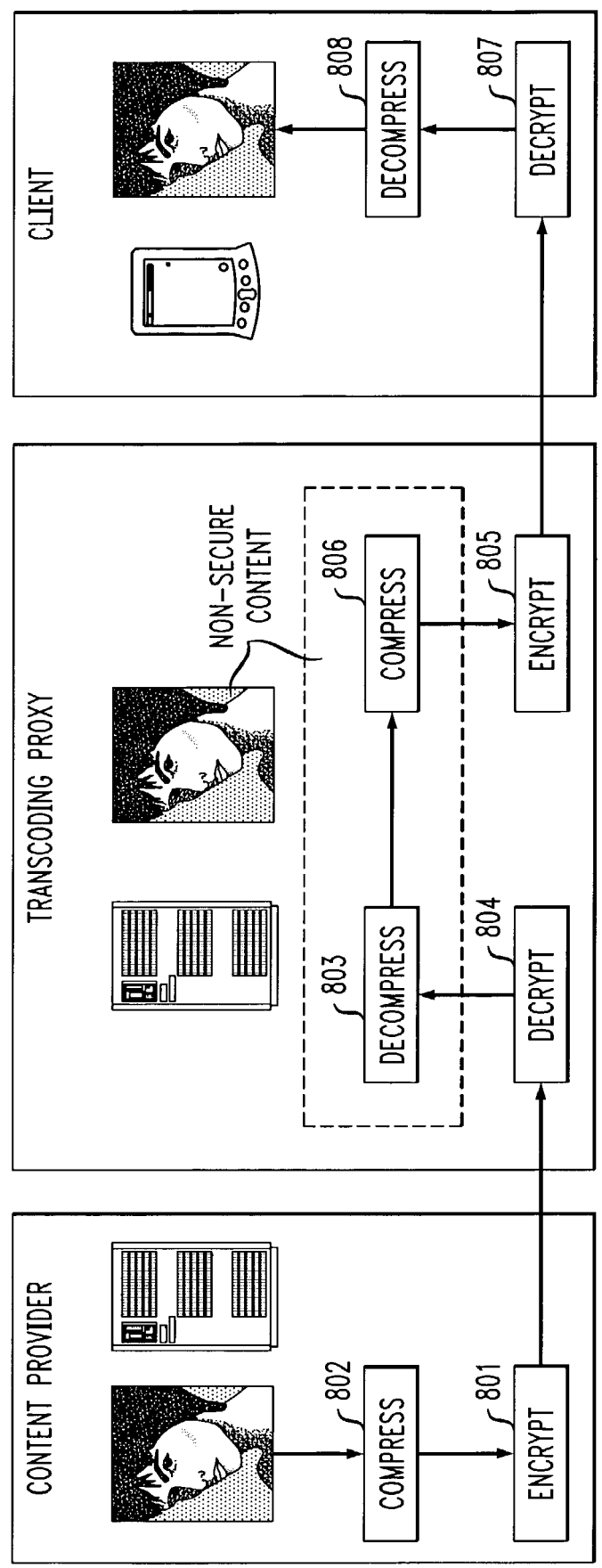
FIG. 8 is a conceptual block diagram illustrating the security problem introduced by a transcoding proxy in a conventional system for transmitting data between a content provider and a client.

As illustrated in FIG. 8, a transcoding proxy may be introduced as an intermediary between a content provider and a client device. The proxy essentially serves to transcode the data such that either the size of the data is reduced, thus improving response time (i.e., data throughput), or the format of the data is transformed into a format adapted for presentation on the client device. In either case, when a transcoding proxy is present in the system, the standard approach to transcoding requires that the proxy first decrypt the encrypted data stream (which has been compressed and encrypted by a content provider) before transcoding can be applied. With reference to FIG. 8, the transcoding proxy first decrypts the data 804, decompresses the data 803, then applies a compression algorithm to re-compress the data 806, thereby changing the size of the data and/or its format. The proxy finally re-encrypts 805 the transcoded data for transmission over a network to the client device. On the client side, the data is again decrypted 807 and decompressed 808 using the new compression (source coding) algorithm from the transcoding proxy.

An important and potentially devastating consequence of this conventional transcoding approach, as illustrated in FIG. 8, is that once the data has been decrypted by the transcoding proxy, and before it is encrypted again, a third party observer can eavesdrop on the unencrypted data. This condition violates the end-to-end security guarantee of privacy implicit in the use of encryption, in which only the sender and receiver are allowed to access the data in its unscrambled state. Though it is possible that in certain cases transcoding proxies may be entities trusted by the sender and receiver to decrypt the data, in general transcoding proxies will seldom be trusted.

Prior art transcoding systems and methods have typically assumed that compression can only be applied to unencrypted data. This is because compression algorithms employed by a transcoder typically require a sophisticated understanding of the semantics and/or statistics of the data in order to reduce the size of the data. Thus far, it has been assumed that this semantic understanding can only be acquired when the data is unscrambled/decrypted.

The present invention is directed to a method and apparatus for securely transcoding data by an intermediary or proxy interposed between one or more data sources (e.g., multimedia content providers), which may be, for example, a Web server, and one or more client devices, which may be, for example, a Web browser or other device. In accordance with the present invention, the transcoding operation is performed on encrypted data without first requiring the decryption of the data. In a preferred embodiment, the invention includes three distributed units or elements, the first unit (e.g., content provider) performing an encoding operation on source data (e.g., multimedia objects), the second unit securely transcoding the data and a third unit (e.g., client device or browser) decoding the data received from the transcoding unit. A flowchart depicting a preferred embodiment of each of these three primary units comprising the present invention is presented in FIGS. 9 through 11 respectively. Moreover, although not limited to this topology, FIG. 12 illustrates an example of an overall secure transcoding system formed in accordance with the present invention.

Although described herein as comprising three separate functional blocks or units, it is to be appreciated that in the system of the present invention, the three functional blocks need not reside in physically distinct or remote locations with respect to one another. For example, it is within the scope of the present invention to have the transcoding unit physically reside with either the content provider or with a client device, assuming a separate transcoding proxy is not used.

Figure 9:
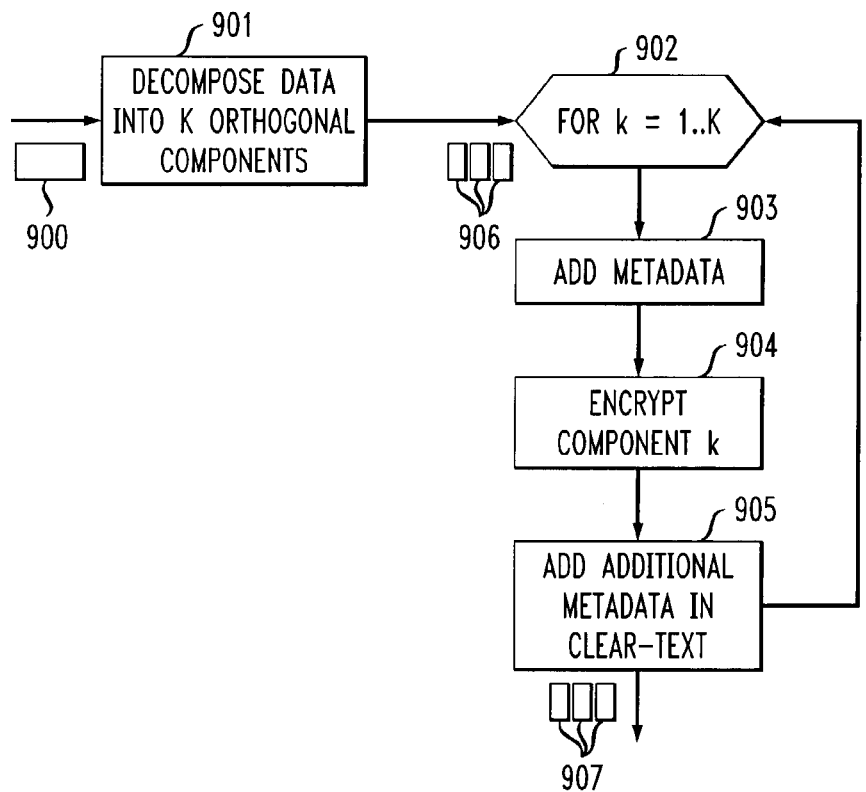
FIG. 9 is a logical flow diagram depicting a method for encoding/encrypting data, in accordance with one embodiment of the present invention.
Figure 10:
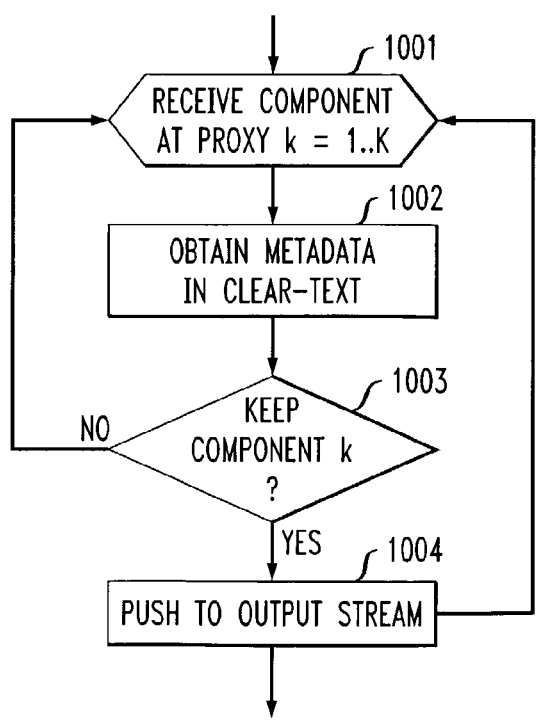
FIG. 10 is a logical flow diagram illustrating a method for transcoding data which is encoded/encrypted using the system of the present invention depicted in FIG. 9.

With reference now to FIG. 9, one embodiment of an encoding unit formed in accordance with the present invention, such as may be implemented by a data content provider, preferably commences an encoding procedure by taking an existing multimedia object or similar data 900 as input and generating, from that data, a predetermined number of components 906 (i.e., componentization) such as by decomposition 901 of the data. Componentization of the data object may result in the generation of K components, where K in this instance is greater than or equal to one. The data components 906 may contain overlapping or redundant data. For example, each data component may contain a copy of the original object. Similarly, the data components 906 may be mutually exclusive with respect to each other. For example, an image may be partitioned into a plurality of non-overlapping geographic regions such that a union of all the regions completely reconstructs the original image, with each region being represented as a distinct component. The componentization process 901 may be performed using known techniques, as appreciated by those possessing ordinary skill in the art, for example by a progressive encoding algorithm or layering algorithm such as sub-band coding and wavelet techniques.

In a preferred embodiment of the present invention (not shown in FIG. 9), each data component 906 may be subsequently compressed or coded (see e.g., reference no. 1202 in FIG. 12). Henceforth, the term "compression" will be used to signify compression and/or coding. It should be appreciated that the term "coding," as it may be traditionally understood, is a more general term than compression, and is often defined as a process that generates a digital representation of a multimedia object or other source data. Unlike compression, however, coding need not generate an output digital representation that is smaller than the input digital representation of the object.

Assuming compression is employed, the compression algorithm or technique applied to a particular data component need not be identical to the compression algorithm applied to another component, although the present invention similarly contemplates that a single compression means may be used. The compression algorithm applied to a component may also accept, as an input parameter, information other than component data corresponding to the original object, such as other information pertaining to the multimedia object that may influence the degree and/or type of compression utilized. FIG. 12 illustrates an example wherein a compression algorithm "C" 1202 receives an individual data component.

The data source/content provider also preferably generates metadata information 903 that is added to or embedded with the data components 906. As known by those skilled in the art, metadata is widely used to characterize the data to which it is attached; in essence, it is "data about data." This metadata 903 may comprise, for example, annotation labels used to identify components and/or may include descriptions regarding the relative or absolute importance of a particular component. Information concerning the semantic content of the component or the overall object, sequence numbers, one-way hashes of component data used for tamper detection, or any other information that may be helpful to the subsequent transcoding process may also be included in the metadata information 903. Moreover, the metadata may be in any suitable language or format compatible with the content provider, transcoding proxy and client device. For example, the metadata may be written in eXtensible Markup Language (XML), of which MPEG-7 is a variant. Henceforth, the metadata information described herein will be referred to as a "metadata header," although it is to be appreciated that the metadata may actually reside anywhere in the message and is not restricted to the beginning of the message or data stream.

With continued reference to FIG. 9, the content provider or data source preferably generates two versions of metadata information to be combined with the components; namely, a version 903 upon which encryption will be performed, and a second version 905 that will remain in a non-encrypted format (i.e., remains in clear-text). Although FIG. 9 illustrates the generation of only two types of metadata, the present invention similarly contemplates that multiple versions of metadata may be generated, each of which may or may not be subject to encryption, or that only a single version of metadata may be generated. The two versions of the metadata header 903, 905 are preferably ultimately used by the client device to detect tampering, among other useful applications. The clear-text version of the metadata header 905 need not be identical to the metadata header 903 subject to encryption. However, assuming a tamper detection scheme is employed by the client device, the metadata version to be encrypted 903 should include sufficient information to enable a client device to compare the two received versions of the metadata header 903, 905 in order to detect tampering of at least the transmitted metadata information.

For each component 906 of the original data 900, the content provider preferably assembles one or more messages 907 for transmission to the client device that combines the clear-text metadata header 905, an encrypted version of the metadata header 904, and/or encrypted component portions of data from one or more components 906. A component portion is defined herein as a subset of the data representing a particular component, which is itself a subset of the data representing the multimedia object 900. Each component 906 of an object 900 preferably comprises one or more component portions, each of which may be designated as including data of a particular type and/or function. For example, a component may include an encrypted data portion and a clear-text metadata portion. Component portions can be generated prior to compression, from the compression process, or from the encryption process. The clear-text metadata header 905 associated with an assembled message may include metadata that need not identify, describe, or otherwise relate to the component portions incorporated in the same message. In an anticipated scenario, the metadata identifies and/or describes one or more, though not necessarily all, component portions incorporated in the same message.

The encryption algorithm or process 904 applied to the combination of the metadata header 903 and compressed component data 902 can differ across components and/or component portions. Even if the encryption algorithm is the same for each component, encryption keys used as input to the encryption algorithm 904 may differ among the metadata headers 903, the various components, or even component portions within a message 907. In essence, a preferred embodiment of the present invention permits each part of the message, whether metadata header or component portion, to be independently and distinctly encrypted. It is contemplated that in a simple case, for example, every metadata header and every component, hence every component portion, of each message may be encrypted using the same algorithm and the same encryption key. In keeping with known terminology in the field of cryptography, encryption keys may be either asymmetric public keys or symmetric keys, as appreciated by those skilled in the art.

The assembled messages 907 representing the various components of the multimedia object, along with any additional embedded information, are preferably transmitted over a communication channel to a transcoding proxy. As discussed previously, the communication channel itself may be implemented in any known fashion, for example, as a dedicated data line or wireless communication link, including cellular, satellite, or microwave networks. In a preferred embodiment of the transcoding proxy operation shown in FIG. 10, the transcoding process is initiated when the transcoding proxy receives 1001 the assembled messages representing the various components of the multimedia object from the content provider. The transcoding proxy preferably extracts the clear-text (i.e., non-encrypted) metadata header 1002 from each assembled message, assuming such clear-text portion is present in the received message. Using the information provided in the extracted metadata header, the transcoding proxy selectively manipulates 1003 the received components, such as by determining which encrypted components or component portions of the received message(s) to filter. It is to be appreciated that other forms of data manipulation may be similarly employed by the present invention for transforming the multimedia object data into a format suitable for use by the client device.

In the context of the present description, the term "filter" is used to connote either dropping or substitution of predetermined components or portions thereof, although other suitable transformation operations as may be required by a transcoding application are similarly contemplated by the present invention. The transcoding proxy preferably bases the decision of whether or not to filter a component or component portion on information provided by the metadata header of a single message, or on information included in the metadata headers of multiple messages. The proxy may then drop portions of a message that have been identified by the metadata information, drop complete messages, or substitute a predetermined portion(s) of a message with other data, assuming the metadata has indicated that such message portions are subject to data substitution. A portion of a message is defined herein as one or more encrypted component portions of the message. The messages remaining after the filtering process, modified in whole or in part, constitute a securely transcoded version of the original data (e.g., multimedia object). Each of these transcoded messages is subsequently transmitted 1004 over a communication channel to a client device.

The process of data manipulation (e.g., selectively filtering—dropping or substituting encrypted annotated components) by the transcoding proxy, in accordance with the present invention, achieves a secure transcoding objective because the size of the resulting multimedia object is compressed by an intermediary without having to decrypt any of the data (i.e., components) representing the object. The metadata headers, or other suitable equivalent annotating data, accompanying each message preferably furnish the transcoding proxy with sufficient semantic understanding of the components to make an informed determination concerning which components to filter and which components to send to the client device.

It is important to recall that conventional approaches to transcoding, in contrast, rely on the data itself providing the semantic understanding, rather than employing a separate metadata header or similar annotation. Consequently, such traditional transcoding techniques require that the data be decrypted first in order to gain access to the semantic information necessary to transcode the data. The present invention circumvents this requirement and illustrates that transcoding via selective filtering of encrypted and annotated componentized content can achieve secure transcoding (e.g., compression of the size of encrypted data), without requiring that the data be decrypted by an intermediary. In this manner, end-to-end security is maintained by the system of the present invention.

Figure 11:
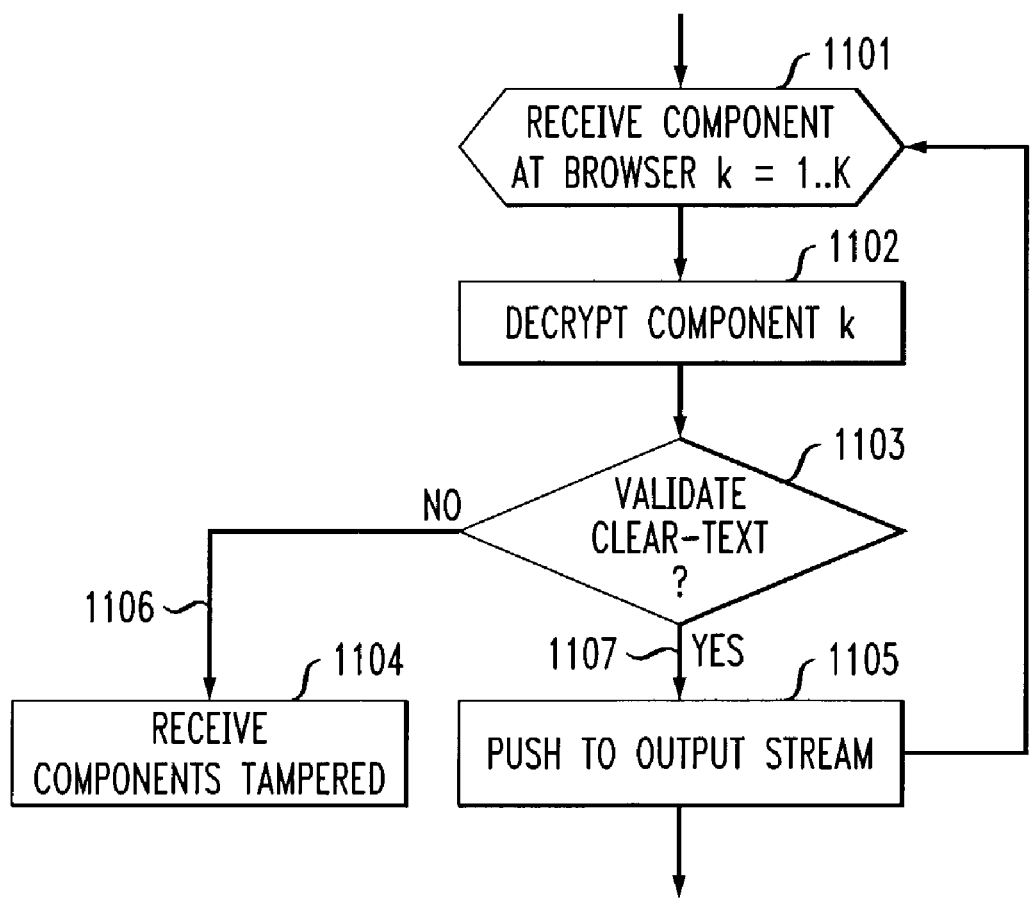
FIG. 11 is a logical flow diagram illustrating a method for decoding/decrypting data at a client device when receiving transcoded data, in accordance with one embodiment of the present invention.
Figure 12:
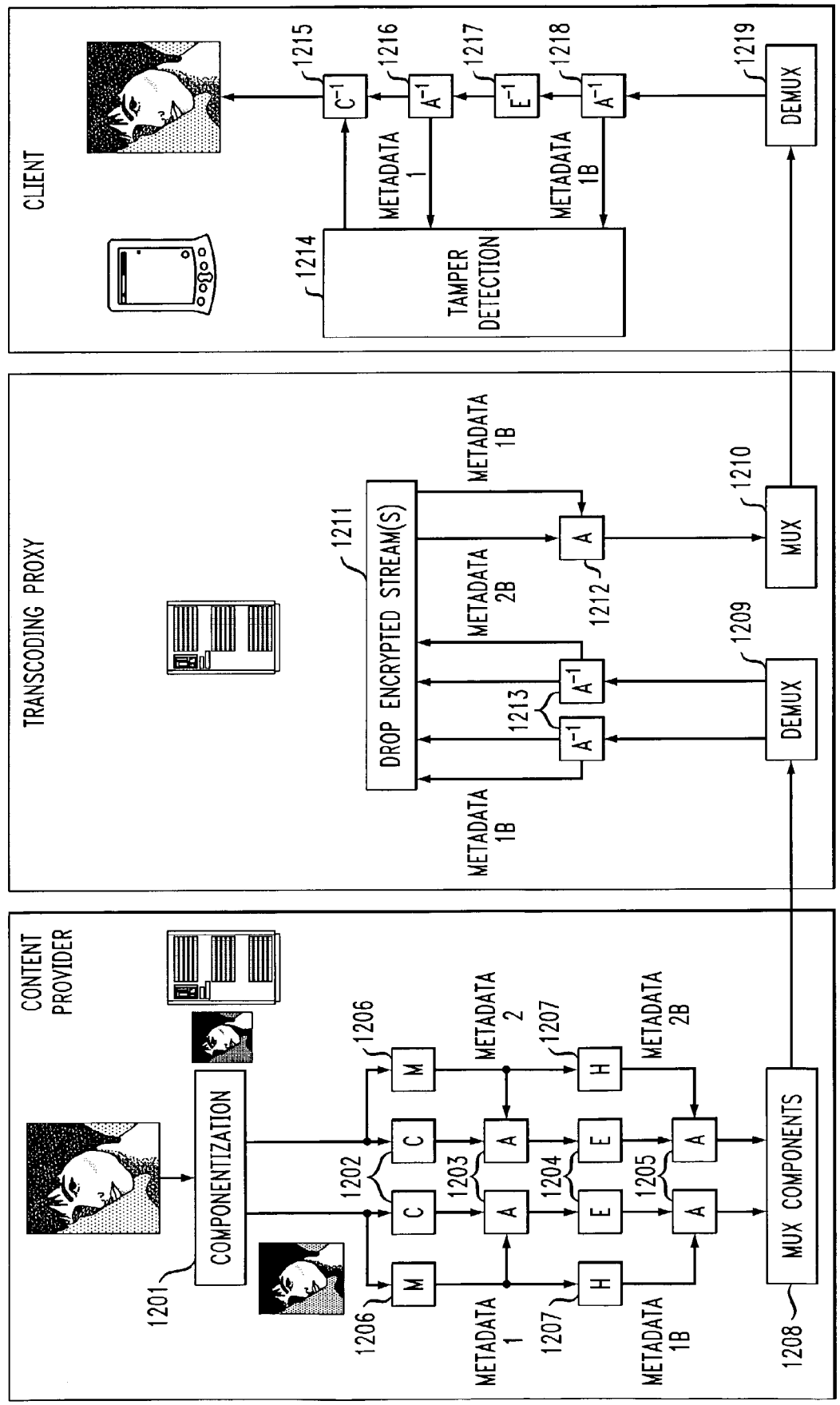
FIG. 12 is a conceptual block diagram illustrating three components of a secure transcoding system, formed in accordance with one embodiment of the present invention.

With reference now to FIG. 11, there is shown a flow diagram for client device processing, in accordance with a preferred embodiment of the present invention. Recall that a client device is preferably operatively connected to the transcoding proxy by way of a communication channel, such as a dedicated data line or wireless communication link. The decoding process at the client device or browser preferably begins with the reception 1101 of a transcoded message component transmitted by the transcoding proxy. For each message received, the client device preferably decrypts 1102 the encrypted portion of the metadata header included in the message and compares or validates 1103 the decrypted header version with the clear-text metadata header embedded in the message. It is to be appreciated that the criteria for determining whether the two header versions (i.e., decrypted and clear-text) match is preferably determined by the client device itself, so that the match need not be exact. Furthermore, it is similarly contemplated that the degree of matching required by the overall transcoding system may be determined by the content provider.

If the two metadata header versions do not match 1106, the client device preferably indicates to a user, in any suitable manner, that there has been tampering with the metadata information. Such tampering indication may be visual, for example an indicator light or text message displayed by the client device, or such indication may be in an audible form. If the two metadata headers match 1107 (i.e., no tampering has been detected), the client device preferably continues processing the encrypted component portion of the message. If the client device decrypts the encrypted component data immediately after the metadata header is decrypted, then only decompression/decoding of the message will be performed at this point. If instead the client device decrypts the encrypted component data after the comparison step 1103 has validated the data, then both decryption and decompression/decoding of the encrypted component data will be performed.

It is to be appreciated that other information embedded in the encrypted metadata header(s) may be used to further extend the tamper detection operation, such as encrypted one-way hashes (to detect tampering with component portions within a message), sequence numbers or time stamps to consider cross-message tampering across the overall multimedia object. For example, if the encrypted metadata header contained one or more encrypted one-way hashes of the component portions, then tampering with encrypted component portions could be detected with high probability by the client device. Also, if the encrypted metadata headers contained sequence numbers, such as "this is message 1 of K", "this is message 2 of K", etc., then the client device would be able to detect one or more missing components in a sequence of received data that may suggest tampering, depending on the definition of tampering used by the client device.

By way of example only, FIG. 12 illustrates a block diagram of a secure transcoding system formed in accordance with the present invention. As shown in FIG. 12, the overall system preferably includes a content provider or similar data source, a transcoding proxy and a client device as the intended recipient of the transcoded data. In the configuration of FIG. 12, assembled messages from the content provider are transmitted to a transcoding proxy over a shared communication channel. In this embodiment, one or more multiplexing/demultiplexing functions 1208, 1209, 1210, 1219 are depicted, although these functions may be provided by the underlying operating system on which the encoding process is implemented. In another embodiment of the present invention, each assembled message or component may traverse a separate path to reach the transcoding proxy, thus the requirement for multiplexing and demultiplexing may be essentially eliminated.

With reference to the content provider side of the secure transcoding system, the original source data object is componentized 1201 into two components, for ease of explanation. The functional box labeled "M" 1206 is used to generate the metadata headers and the functional box labeled "H" 1207 is used to generate the corresponding clear-text metadata headers. The generation of clear-text metadata will preferably use information already generated for metadata header 1206. In the simplest case, both versions of the metadata header will preferably be identical, although the present invention is not limited to this approach. The metadata header to be encrypted for component 1 is labeled "Metadata 1" while the corresponding clear-text version of the metadata header for component 1 is labeled "Metadata 1B." Similarly, the metadata header to be encrypted for component 2 is labeled "Metadata 2" and the corresponding clear-text version of the metadata header for component 2 is labeled "Metadata 2B."

The metadata headers 1 and 1B, generated by process 1206 and 1207 respectively, are preferably derived only from the data of component 1. A metadata header is appended 1203 to an existing packet or component of information resulting from compression 1202. First, the metadata header 1 is appended to the compressed data of component 1 and this collection is encrypted 1204. Second, the clear-text metadata header 1B is appended to the encrypted collection comprising the metadata header and compressed component data. The output of the second appending operation 1205 is an assembled message 1. In this example, all parts of message 1—the clear-text metadata header, the encrypted metadata header, and the encrypted component data—are preferably derived exclusively from component 1 and not from any other component. Similarly, another message is generated based exclusively on component 2. Note that this example does not illustrate the general case of further dividing a component into component portions, nor does this example show that a message may include component portions arising from different components, all of which are within the scope of the present invention. Moreover, the assembly of the message is not restricted to two sequential appending operations, as shown in FIG. 12.

Referring now to the transcoding proxy in the example system of FIG. 12, the transcoding proxy is illustrated as receiving two components. These components are preferably demultiplexed 1209 and their clear-text metadata headers extracted 1213 ("Metadata 1B" and "Metadata 2B"). In this example, the transcoding proxy manipulates the components by dropping 1211 component 2 and forwarding the remaining component 1 on towards its destination, namely the client device. In general, however, there may be K messages, and the proxy may drop L of these messages, where L is less than or equal to K, and may modify the remaining K-L messages, such as by filtering (e.g., substituting messages or message portions). The remaining message may be subsequently reassembled 1212 (e.g., metadata headers are joined back with the respective data with which they arrived).

With regard to the filtering process itself, the effect of mapping one message to exclusively one component is that the transcoding proxy downstream can only base its filtering decision on absolute priority information rather than on the relative importance of the components with respect to each other. In other words, the transcoding proxy receiving message 1, for instance, will inspect its corresponding metadata header 1B, which can only convey the absolute importance of component 1 since the metadata is not based on other component information. For example, message 1 may describe itself as having absolute priority 50. If the proxy utilizes a policy that drops all packets/messages with a priority less than 10 when it is congested, then the proxy will never make a determination to drop this message. No further information about the other components of the multimedia object are needed at the proxy to make this decision. Although requiring a relatively simple architecture, for several reasons this approach may not be well-suited for all applications.

It is therefore important to note that the secure transcoding architecture of the present invention similarly supports the case in which the transcoding proxy bases its determination of whether to filter (or otherwise manipulate/transform) a particular component on the relative importance/priority of the components with respect to each other. In this embodiment, metadata headers from one or more messages preferably contain relative ranking or priority information that must be collected at the proxy and compared before the proxy can decide which component(s), component portion(s), and/or message(s) to filter. For example, component 1 may convey only its relative importance (e.g., that component 1 is more important or has higher priority than component 2) instead of an absolute priority. In this case, the proxy must wait a predetermined period of time to collect enough metadata information before making its filtering decision.

With reference to client side processing in the example system of FIG. 12, for each component that has been demultiplexed 1219, the client device preferably first extracts 1218 the clear-text metadata header (Metadata 1B). This clear-text metadata is preferably stored for later comparison 1214 with the decrypted version of the metadata header (Metadata 1). After extracting the clear-text metadata header, the client device preferably decrypts 1217 both the encrypted metadata header and the encrypted component data. The decrypted metadata header (Metadata 1) is then extracted 1216 from the decrypted component data and compared 1214 to the clear-text metadata header in order to detect possible tampering. Assuming no tampering has been found, the client device preferably decompresses 1215 the component data for presentation to a user. Depending on the capability of the client device, if tampering has been detected (i.e., the two versions of the metadata headers do not match to an acceptable degree), a tampering indication is preferably presented to the user. Alternatively, the client device may simply ignore the data as being potentially corrupted.

Figure 13:
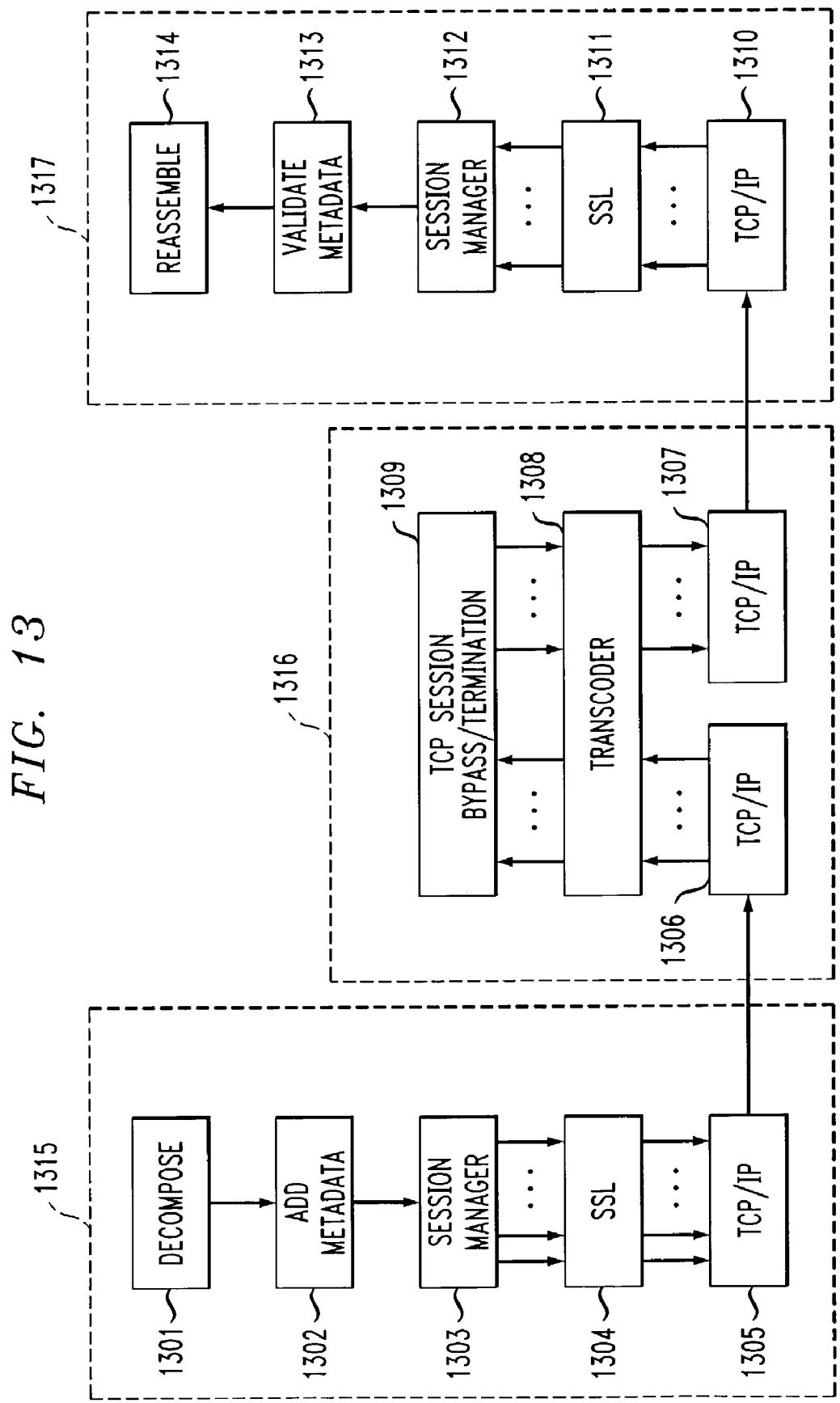
FIG. 13 is a block diagram depicting a system for transcoding data in a networked environment comprising a proxy and employing a secure socket layer (SSL), in accordance with another embodiment of the present invention.

The system of the present invention can be implemented using existing Secure Socket Layer (SSL) infrastructure, an example of which is illustrated in FIG. 13. In this example implementation, a session manager 1303 on the sender or content provider 1315 side preferably creates multiple SSL connections and manages all of these SSL connections simultaneously. The session manager 1303 is also responsible for creating one or more non-SSL connections so that the session information can be intercepted in clear-text by the transcoding proxy 1316. Preferably, the transcoding proxy will be responsible for determining whether a TCP connection will be relayed or dropped 1309 based on the metadata sent through the clear-text channel from the sender as well as the transcoding policy. The recipient or client side (browser) session manager 1312 is responsible for assembling the incoming channels 1314 into a single message for use by the browser 1317. Note, that in this implementation, the metadata for each individual component is implied by the connection id between the session manager. Additional metadata that needs to be in clear-text format is preferably communicated by additional non-SSL connections.

A method and apparatus for disseminating networked information formed in accordance with the present invention provides a means for securely transcoding data by an intermediary or transcoding proxy, such as multimedia objects. The source data is first componentized at the content provider into a plurality of data components representing the original source data. An unencrypted metadata header is attached to each component before being sent to the proxy as a message. The proxy manipulates the data components based on the unencrypted (clear-text) metadata, or other data providing a semantic understanding of the component, extracted from the received messages and forwards only predetermined components adapted for display on the client device. With the system of the present invention, networked information from a content provider can be securely transcoded by a proxy operatively connected to the content provider without the proxy decrypting the source data.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method for securely transcoding data from a content provider for use by a client device, comprising the steps of:
   generating a plurality of data components at the content provider, the components being a decomposition of the data;
   encrypting each of the data components;
   transmitting the encrypted data components from the content provider to a transcoding proxy;
   transcoding, at the proxy, the encrypted data components;
   selectively manipulating the transcoded encrypted data components; and
   transmitting the manipulated transcoded data components generated by the transcoding proxy to the client device;
   wherein the steps of transcoding and manipulating the encrypted data components are performed without a need for first decrypting the encrypted data components.

2. The method of claim 1, wherein the data is a multimedia object.

3. The method of claim 2, wherein the multimedia object is selected from the group consisting of a text page, an image, audio, video, relational data, an XML document, and a hybrid object, the hybrid object being a combination of multimedia objects.

4. The method of claim 1, wherein the step of transmitting the encrypted data components to the transcoding proxy further comprises the steps of:
   assembling, at the content provider, at least one message, the message including at least one encrypted component portion; and
   transmitting the at least one message to the transcoding proxy.

5. The method of claim 4, further comprising the step of extracting, at the transcoding proxy, the at least one encrypted component portion from the at least one message received by the transcoding proxy.

6. The method of claim 1, wherein the step of selectively manipulating the transcoded data components at the proxy further comprises the step of filtering the transcoded components by dropping at least one of the encrypted data components.

7. The method of claim 1, wherein the step of selectively manipulating the transcoded data components at the proxy further comprises the step of filtering the transcoded components by substituting alternative data for at least one of the encrypted data components.

8. The method of claim 1, wherein the step of transmitting the manipulated transcoded data components to the client device further comprises the steps of:
   assembling, at the transcoding proxy, at least one message including at least one manipulated component portion; and
   transmitting the at least one message to the client device.

9. The method of claim 8, further comprising the steps of:
   extracting, at the client device, the at least one manipulated component portion from the at least one message received by the client device;
   decrypting the at least one manipulated component portion; and
   reassembling a transcoded representation of the data from the at least one decrypted component portion.

10. The method of claim 1, further comprising the step of annotating at least one of the data components with metadata, the metadata providing a semantic understanding of the data components.

11. The method of claim 10, wherein the annotating step comprises creating a non-encrypted clear-text metadata header.

12. The method of claim 11, wherein the clear-text metadata header includes at least one label that uniquely identifies a data component.

13. The method of claim 11, wherein the clear-text metadata header includes information describing a priority associated with at least one data component.

14. The method of claim 11, further comprising the steps of:
   assembling at least one message combining the clear-text metadata header and at least one encrypted data component; and
   transmitting the at least one assembled message to the transcoding proxy.

15. The method of claim 14, further comprising the steps of:
   disassembling, at the transcoding proxy, the at least one assembled message to extract the clear-text metadata header and the at least one encrypted data component from the message; and
   selectively manipulating the at least one encrypted data component in accordance with metadata information obtained from the at least one clear-text metadata header.

16. The method of claim 15, further comprising the steps of:
   assembling, at the transcoding proxy, at least one transcoded message combining the clear-text metadata header and the at least one manipulated encrypted data component; and
   transmitting the at least one transcoded message to the client device.

17. The method of claim 16, further comprising the steps of:
   disassembling the at least one transcoded message received by the client device to extract the clear-text metadata header and the at least one manipulated encrypted data component;
   decrypting the at least one manipulated data component; and
   reassembling a transcoded representation of the data from the at least one decrypted manipulated data component.

18. The method of claim 11, further comprising the steps of:
   creating a second version of the clear-text metadata header; and
   encrypting the second version of the clear-text metadata header.

19. The method of claim 18, further comprising the steps of:
- assembling at least one message comprising the clear-text metadata header, the encrypted second version of the clear-text metadata header and at least one encrypted data component; and
- transmitting the at least one assembled message to the transcoding proxy.

20. The method of claim 19, further comprising the steps of:
- disassembling the at least one assembled message received by the client device to extract the clear-text metadata header, the encrypted second version of the clear-text metadata header and at least one manipulated encrypted data component;
- decrypting the encrypted second version of the clear-text metadata header;
- decrypting the at least one manipulated encrypted data component; and
- reassembling a transcoded representation of the data from the at least one decrypted manipulated data component.

21. The method of claim 20, further comprising the step of comparing the decrypted second version of the clear-text metadata header received by the client device to the clear-text metadata header to detect tampering with the clear-text metadata header.

22. The method of claim 20, further comprising the step of comparing information included in the decrypted second version of the clear-text metadata header to the at least one manipulated decrypted data component to detect tampering with the at least one manipulated decrypted data component.

23. The method of claim 1, further comprising the step of compressing at least one data component prior to encryption of the component.

24. The method of claim 23, further comprising the step of decompressing, at the client device, the at least one data component subsequent to decryption of the component.

25. The method of claim 1, wherein the step of generating the data components comprises decomposing the data into a plurality of mutually exclusive components corresponding to a non-overlapping partitioning of the data.

26. A system for securely transcoding multimedia data comprising:
- at least one content provider, the content provider generating a plurality of components from said multimedia data and encrypting each of the plurality of components;
- at least one transcoding proxy operatively connected to the at least one content provider, the transcoding proxy receiving at least one encrypted component from said content provider and selectively manipulating the at least one encrypted component; and
- at least one client device operatively connected to the at least one transcoding proxy, the at least one client device receiving and decrypting the at least one manipulated encrypted component, and reassembling a transcoded version of the multimedia data from the at least one manipulated decrypted component;
- wherein the at least one transcoding proxy is operative to selectively manipulate the at least one encrypted component without a need for first decrypting the at least one encrypted component.

27. The system of claim 26, whereby the transcoding proxy selectively manipulates the at least one encrypted component in accordance with priority information associated with each of the components, the priority information describing at least one of an absolute importance of a corresponding component and a relative importance of a corresponding component with respect to another component.

28. An apparatus for securely transcoding multimedia data for use by a client device, the apparatus comprising:
- at least one transcoding proxy connecting to at least one content provider, the content provider generating a plurality of components from the multimedia data and encrypting each of the plurality of components, the at least one transcoding proxy receiving at least one encrypted component from the content provider and being operative: (i) to transcode the at least one encrypted component; and (ii) to selectively manipulate the at least one transcoded encrypted component, the transcoding and manipulating of the at least one encrypted component being performed without a need for first decrypting the at least one encrypted component;
- wherein the at least one transcoding proxy is operative to transmit the at least one manipulated transcoded component to the client device.

* * * * *